Sept. 6, 1927.

V. C. HUNTINGTON 1,641,276

METHOD OF AND APPARATUS FOR ADVANCING ARTICLES

Filed Sept. 26, 1924     2 Sheets-Sheet 2

Inventor
Victor C. Huntington
by A. A. Patturan
Atty.

Patented Sept. 6, 1927.

1,641,276

UNITED STATES PATENT OFFICE.

VICTOR C. HUNTINGTON, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR ADVANCING ARTICLES.

Application filed September 26, 1924. Serial No. 740,105.

This invention relates to a method of and apparatus for advancing articles, and particularly to a method of and apparatus for advancing articles by projecting fluid against the same.

An object of the invention is to provide a simple method of and apparatus for rapidly advancing an article through a predetermined path or to a predetermined position.

In one embodiment of the invention the improved method is practiced by means of apparatus for intermittently advancing a tube or other pieces of stock through a tubular guide so as to present it to a rotary blade which cuts it into sections, the length of each section being determined by a stop against which the tube is advanced. To so advance the tube several jets of air are continuously projected into the tubular guide, against the periphery of the tube at an angle to the direction in which it is to be advanced. The several jets are spaced laterally around the tube and the air repeatedly and yieldingly urges it toward and against the stop, the cutting blade severing a section from the tube each time it is brought against the stop. The stop is perforated to prevent back pressure between it and the tube.

Figure 1:
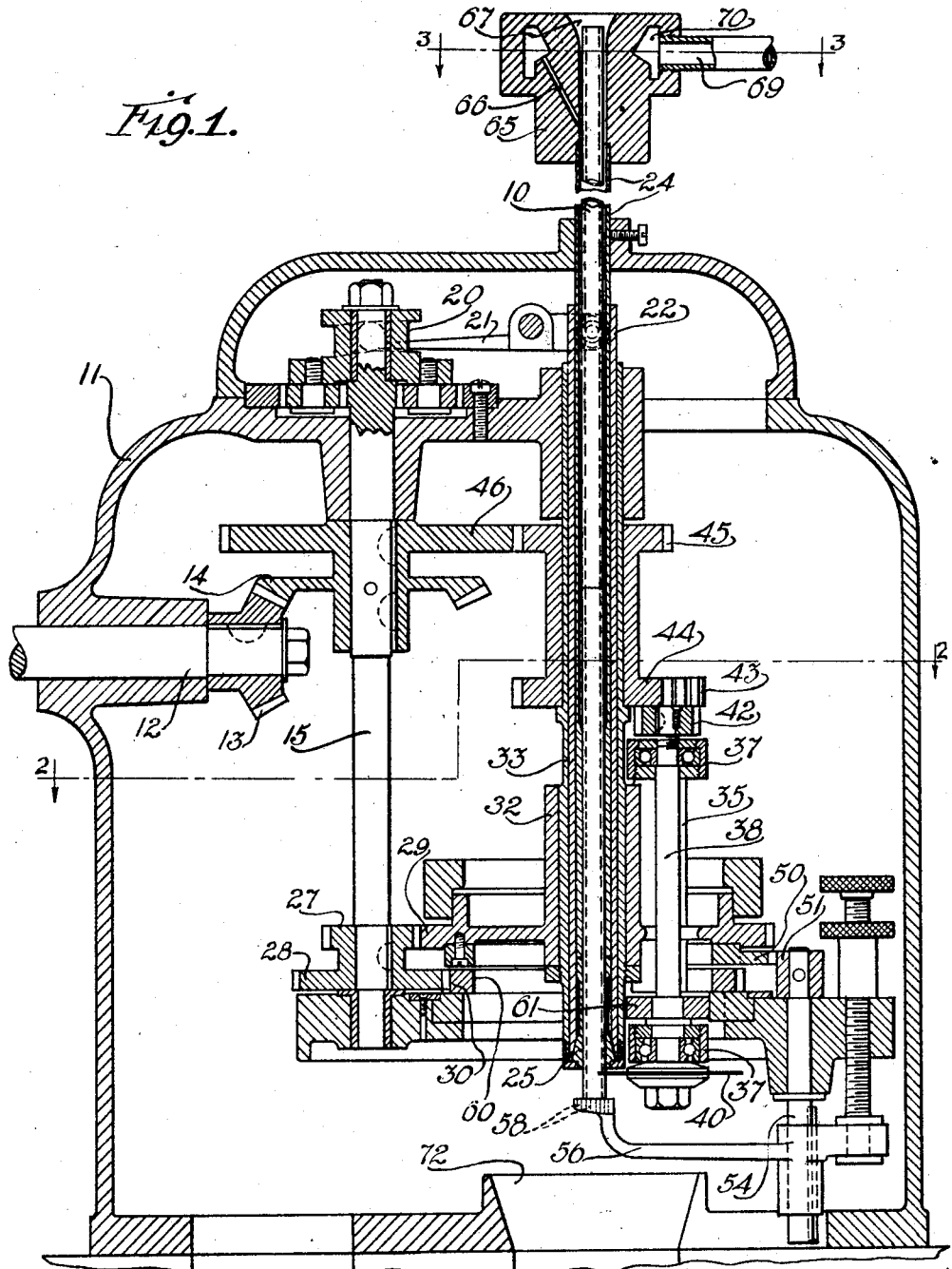
Figure 2:
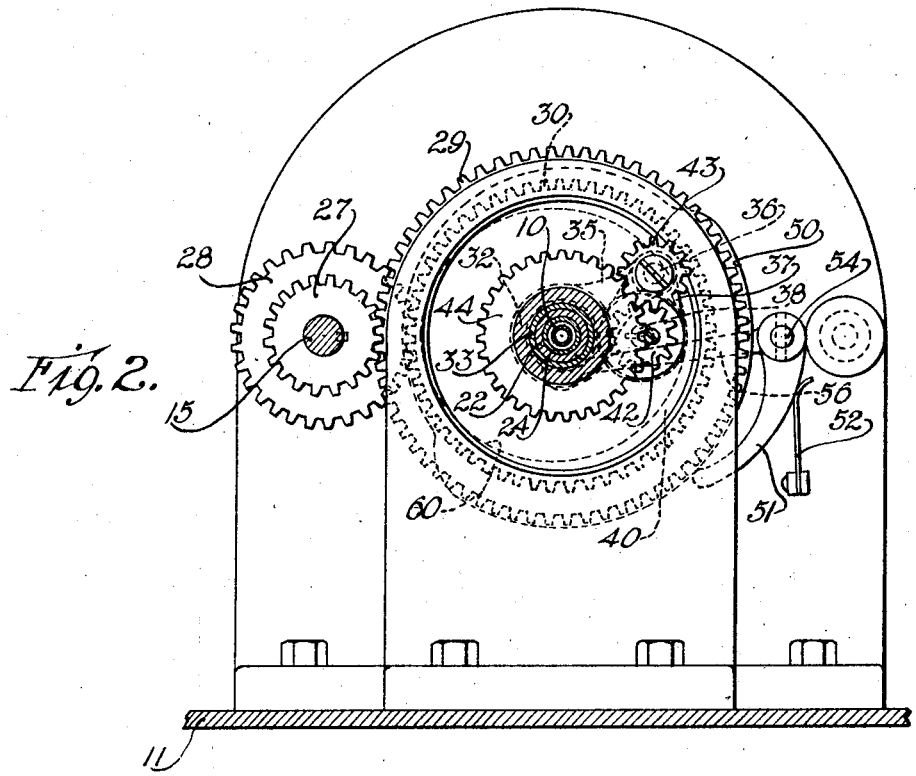
Figure 3:
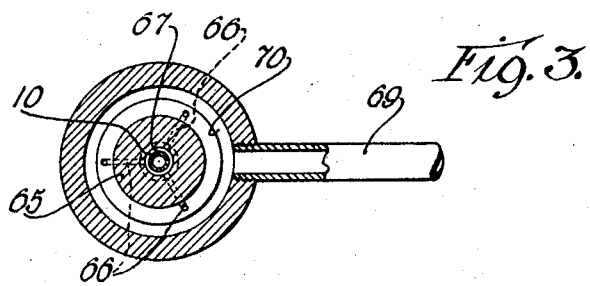

Other objects and features of the invention will become apparent as the detailed description progresses, reference being had to the accompanying drawings, wherein Fig. 1 is a vertical sectional view through apparatus embodying the invention, and Figs. 2 and 3 are sections taken on lines 2—2 and 3—3, respectively, of Fig. 1 looking in the direction indicated by the arrows.

It is believed that a complete understanding of the improved method will be procured from a detailed description of apparatus whereby the method may be practiced.

The embodiment of the invention shown in the accompanying drawings is adapted to cut tubes or other stock into sections of predetermined lengths, the stock being indicated in the drawings by the reference character 10.

Referring for the present to Fig. 1, 11 is a housing in which the improved apparatus is mounted and in which a shaft 12 is rotatably journaled, the shaft 12 being driven by any suitable means (not shown). Bevel gears 13 and 14 operatively connect the shaft 12 with a vertically disposed shaft 15 rotatably journaled in the housing 11. Planetary gearing is provided whereby the shaft 15 drives a cam 20 journaled on the shaft. The cam 20 is adapted to oscillate a lever 21 in such manner that it imparts a reciprocatory movement to a sleeve 22 slidably mounted upon a tubular member 24 rigidly secured in the housing 11. The lower end of the sleeve 22 engages a collet 25 and when reciprocated is adapted to cause the collet 25 to alternately seize and release the lower end of the tube 10 which has been inserted in the tubular member 24.

Keyed to the shaft 15 are pinions 27 and 28, the pinions 27 and 28 meshing with gears 29 and 30, respectively. The gear 29 has an integral hub 32 rotatably journaled upon a sleeve 33 disposed around the sleeve 22. Formed integral with the hub 32 is a boss 35 which journals a shaft 36. Pivotally secured to the shaft 36 are links 37 which journal a shaft 38. A cutting disc 40 is secured to the shaft 38 for severing the tube 10. The shaft 38 is driven by a pinion 42 meshing with a pinion 43 which meshes with a gear 44 rotatably journaled upon the sleeve 33. Formed integral with the gear 44 is a gear 45 which meshes with a gear 46 keyed to the shaft 15.

Constrained to rotate with the gear 29 is a cam 50 against which the free end of a lever 51 is yieldingly urged by a spring 52. The lever 51 is secured to a pivotally mounted pin 54. Splined to the pin 54 is a stop member 56 which the cam 50 is adapted to bring into and out of a position wherein it registers with the lower end of the tubular member 24. The stop member 56 is provided with perforations 58, the purpose of which will presently appear. Secured to the gear 30 is a rotatably journaled cam 60 which cooperates with a roller 61 fastened to the shaft 38 to bring the cutting blade 40 against the tube when it is to be severed, the arrangement being such that the cutting blade 40 is rotated bodily around the stop twice for each cycle of operation. The cam 60 brings the cutting disc 40 into its cutting position during one of these revolutions, the roller 61 being held against the cam 60 by centrifugal force. The cutting disc 40 is simultaneously rotated around the axis of the shaft 38 by the pinion 42.

This invention is not particularly concerned with the details of the above described mechanism, but is particularly concerned with means for advancing the tube 10.

Secured to the upper end of the tubular member 24 is a block 65 having a plurality of bores 66 through which jets of air may be directed against the tube 10 positioned in the tubular member 24. The bores 66 are spaced laterally around a central bore 67 formed in the block 65 in such manner that it becomes a continuation of the passage through the tubular member 24. The air under pressure is supplied through bores 66 from any suitable means (not shown) through a pipe 69 communicating with an annular chamber 70 formed in the block 65, the annular chamber 70 in turn communicating with the bores 66. The bores 66 converge in the direction in which the tube is to be advanced and direct the air against it at an angle to that direction. The air impinges upon the tube and yieldingly urges it against the stop member 56 and then travels downward through the tubular member 24. An additional amount of air is drawn into the upper end of the tubular member 24 and it aids in advancing the tube.

In the operation of the apparatus one or more pieces of tube 10 are inserted in the tubular member 24 in the manner illustrated in Fig. 1. The air under pressure is then admitted through the bores 66 and the machine is set in operation. During each cycle of operation the cutting disc 40 cuts off a section of the tube, the length of the section being determined by the stop member 56 which is spaced a predetermined distance from the cutting disc. The arrangement is such that the air urges the lower end of the tube against the stop, whereupon the tube is seized by the collet 25. The stop then swings to one side and the cutting disc severs a section from the tube. After the severed section has dropped through an opening 72 formed in the housing 11, the stop 56 returns to a position wherein it registers with the tubular member 24 and the collet 25 releases the stop. The severed end of the tube is then urged against the stop by the jets of air flowing from the bores 66, whereupon the next cycle of operation takes place. The perforations 58 in the stop member 56 permit the air flowing from the lower end of the tubular member 24 to pass through the stop so that no back pressure is created between the stop and the tube.

While the stock 10 has been shown to comprise a plurality of tubes of substantially cylindrical form, it is to be understood that substantially solid stock would be handled in a substantially identical manner and that it is not necessary to alter the tubular member 24 if it is desired to advance stock having a noncircular cross-section.

What is claimed is:

1. A method of intermittently advancing an article through a walled passageway, which consists in projecting fluid against the periphery of the article at a plurality of points therearound and at an angle to the direction in which the article is to be advanced to thereby advance the article along the passageway and maintain it spaced from the wall thereof, and holding the article against advancement at predetermined intervals of time.

2. A method of advancing a train of articles through a walled passageway in a substantially straight path, which consists in projecting a gaseous medium against the periphery of one of the articles at a plurality of points therearound and at an angle to the direction in which the articles are to be advanced, and in constraining the gaseous medium to travel along said path after it strikes said article between the article and the wall of the passageway and maintain the article separated from the wall.

3. In apparatus for advancing an article, tubular means for guiding the article, and means for directing a plurality of jets of fluid against the periphery of the article at an angle to the direction in which it is to be advanced, the jets being spaced laterally around the periphery of the article, and maintaining the article spaced from the interior wall of the tubular means.

4. In apparatus for intermittently advancing articles, means for guiding an article, means for projecting fluid against the article at an angle to the direction in which it is to be advanced, and a stop for preventing advancement of the article, said stop being formed to permit air to pass between it and the article.

5. In apparatus for intermittently advancing tubular articles, means for guiding a tubular article, means for projecting fluid against the article at an angle to the direction in which it is to be advanced, and a stop for preventing advancement of the article, said stop having an aperture registering with the opening in one end of the tubular article.

6. In apparatus for intermittently advancing an article, means for guiding an article, a nozzle provided with a plurality of passages spaced laterally around the article associated with one end of said means designed to project fluid into said means against the article at an angle to the direction of its advancement, the nozzle being provided with an annular chamber into which the passages extend, a connection therefrom to a source of fluid supply, and a stop for limiting the advancement of the article.

7. In apparatus for advancing and working an article, means for guiding an article, a nozzle provided with a plurality of passages spaced laterally around the article associated with said passage designed to project fluid into said means against the article at an angle to the direction of its advancement, means for stopping the article upon a predetermined advance, article working means, and means for subsequently causing a relative movement between the article and the working means to perform work on the article.

In witness whereof, I hereunto subscribe my name this 6th day of September, A. D. 1924.

VICTOR C. HUNTINGTON.